United States Patent [19]

Zapel

[11] 4,131,253

[45] Dec. 26, 1978

[54] VARIABLE CAMBER TRAILING EDGE FOR AIRFOIL

[75] Inventor: Edwin J. Zapel, Hobart, Wash.

[73] Assignee: The Boeing Company, Seattle, Wash.

[21] Appl. No.: 817,541

[22] Filed: Jul. 21, 1977

[51] Int. Cl.$^2$ .............................................. B64C 3/48
[52] U.S. Cl. ..................................... 244/219; 244/215
[58] Field of Search ................. 244/219, 218, 214, 215

[56] References Cited

U.S. PATENT DOCUMENTS

| | | | |
|---|---|---|---|
| 1,412,455 | 4/1922 | Crowell et al. | 244/219 |
| 1,585,586 | 5/1926 | Hewitt | 244/219 |
| 1,690,765 | 11/1928 | Antoni | 244/219 X |
| 1,710,672 | 4/1929 | Bonney | 244/215 |
| 1,710,673 | 4/1929 | Bonney | 244/215 |
| 1,766,107 | 6/1930 | Cook | 244/214 |
| 1,813,485 | 7/1931 | Cook | 244/214 |
| 1,823,069 | 9/1931 | Stroop | 244/219 |
| 1,828,981 | 10/1931 | Parker | 244/219 |
| 1,886,362 | 11/1932 | Antoni | 244/219 X |
| 2,022,806 | 12/1935 | Grant | 244/219 |
| 2,650,047 | 8/1953 | Carhart et al. | 244/219 |
| 3,109,613 | 11/1963 | Bryant et al. | 244/219 |
| 3,332,383 | 7/1967 | Wright | 244/219 X |
| 3,698,668 | 10/1972 | Cole | 244/219 |
| 3,941,344 | 3/1976 | Cole | 244/214 |
| 3,994,451 | 11/1976 | Cole | 244/219 X |

FOREIGN PATENT DOCUMENTS 574500  7/1924  France .................................. 244/219
269848  11/1927  United Kingdom ..................... 244/219

Primary Examiner—Barry L. Kelmachter

[57] ABSTRACT

An airfoil having a support frame, a trailing edge end section, and upper and lower variable camber skin sections extending rearwardly from the support frame to the trailing edge end section. A walking beam is positioned between the upper and lower variable camber skin sections, and comprises a forward positioning section and a rearwardly extending locating arm. The positioning section is connected to the lower swing ends of two pivot links which extend upwardly and convergently toward one another to connect to the pivot frame at spaced locations so that forward or rearward movement of the positioning section causes the locating arm of the walking beam to rotate, respectively, downwardly or upwardly. A trailing edge beam is connected by its forward end to the support frame and by its rear end to the trailing edge end section, with the trailing edge beam being connected at an intermediate portion thereof to the rear end of the locating arm of the walking beam. Thus, downward or upward rotational movement of the locating arm of the walking beam causes a corresponding downward or upward rotational movement of the trailing edge end section of a correspondingly greater degree of rotation, relative to the locating arm.

15 Claims, 4 Drawing Figures

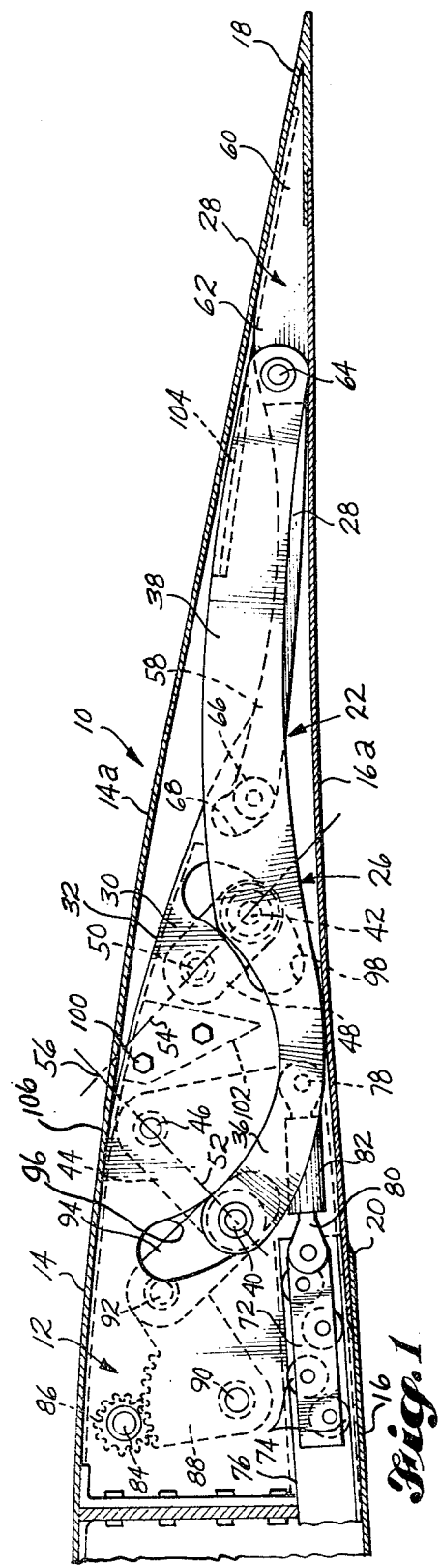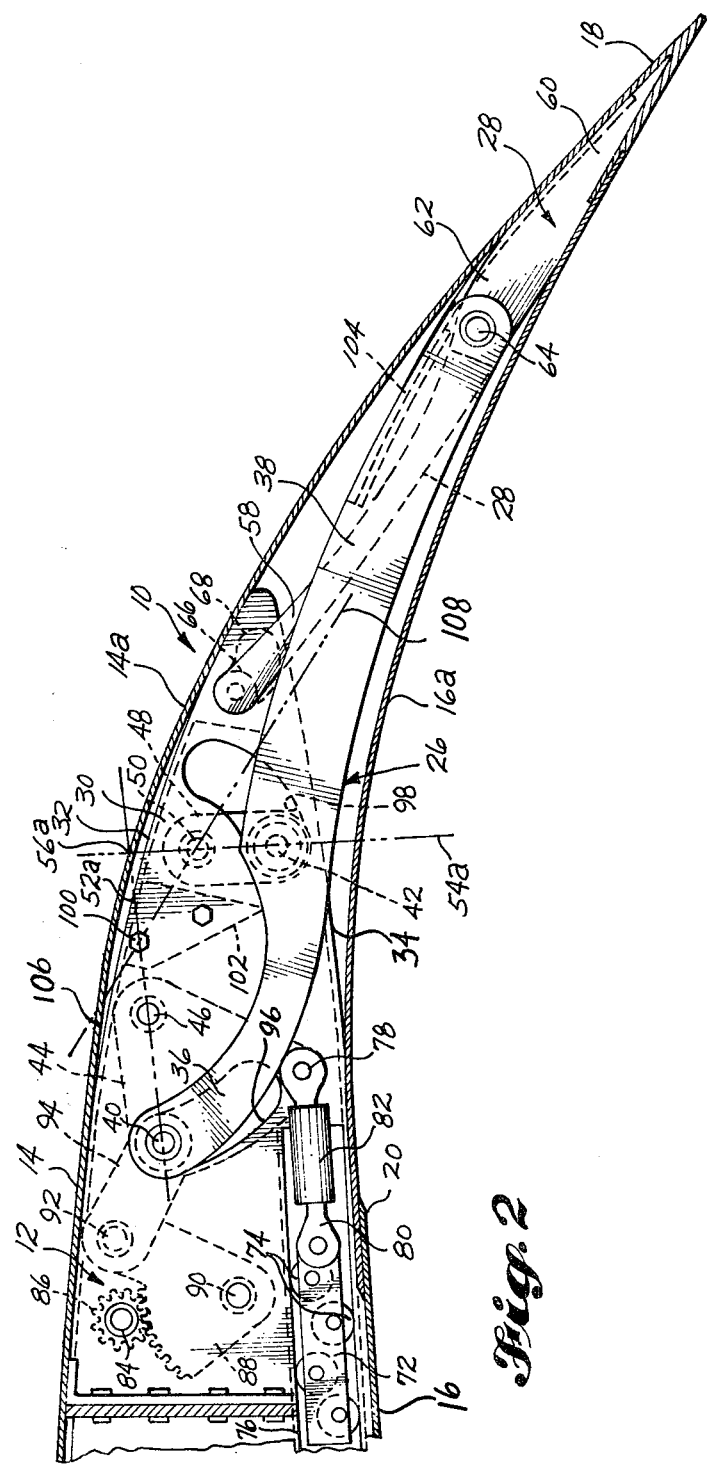

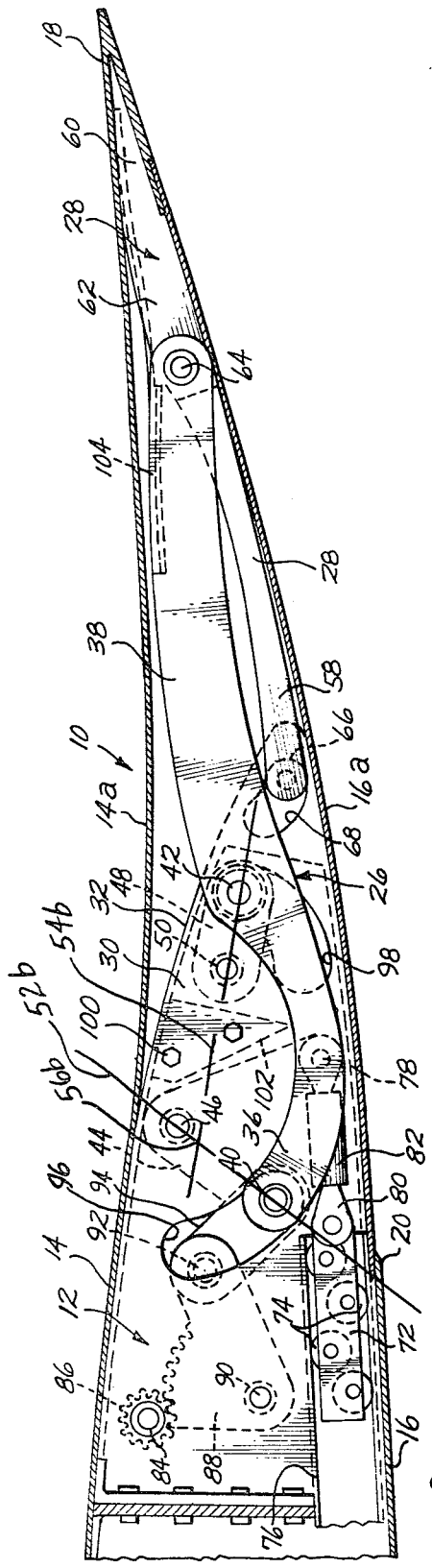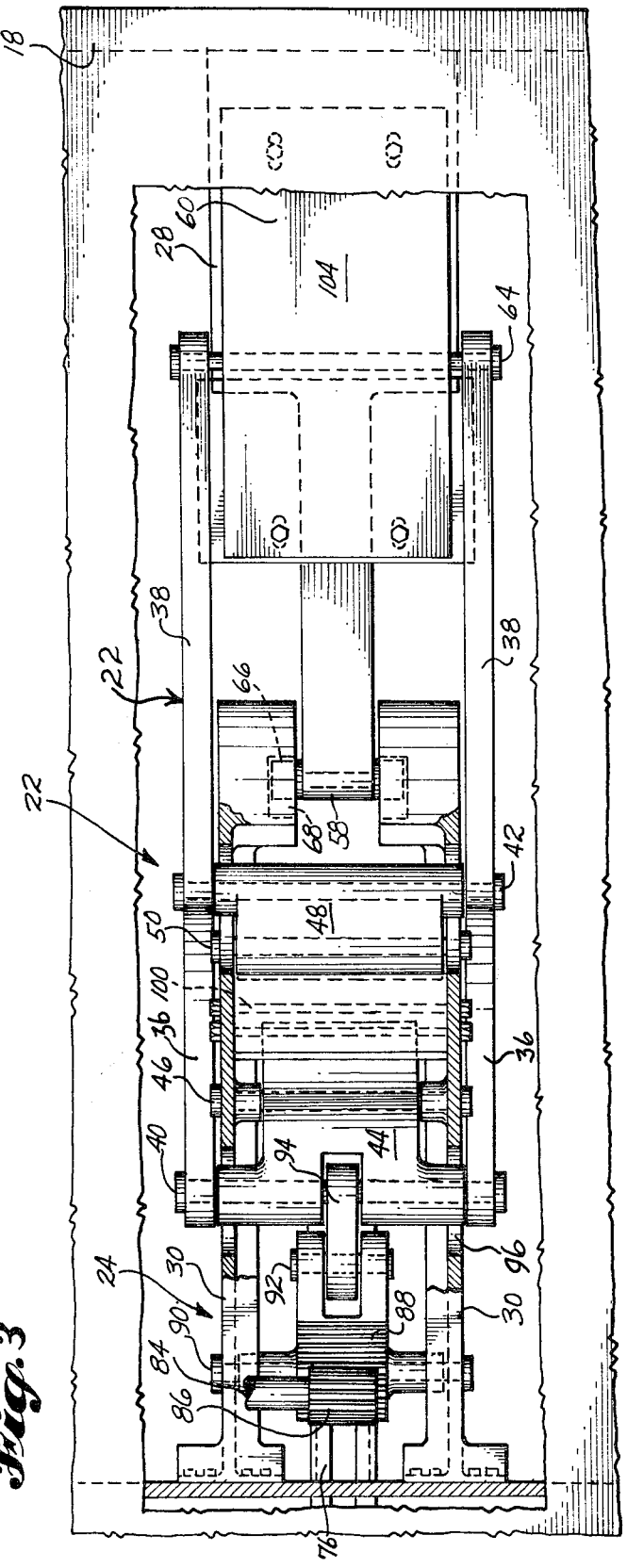

VARIABLE CAMBER TRAILING EDGE FOR AIRFOIL

BACKGROUND OF THE INVENTION

A. Field of the Invention

The present invention relates to a variable camber airfoil, and more particularly to an apparatus particularly adatped to vary the camber of the trailing edge portion of an airfoil.

B. Brief Description of the Prior Art

A common way of modifying the lift characteristics of an airfoil for low speed operation is to use leading edge and trailing edge devices which either pivot or slide outwardly from the airfoil to a deployed position. With many such devices, there is the problem that during deployment, there is an interruption in smooth air flow over the airfoil. Also, many of these devices are not able to be deployed to intermediate positions while maintaining the proper flow of air over the airfoil.

Accordingly, there have appeared in the prior art various devices to vary the shape of the airfoil itself in a manner to change the camber and thus modify its lift characteristics. One common method employed in the prior art is to pivotally mount the trailing edge section of the airfoil in some manner to the main structure of the wing. Typical of such devices are those shown in the following patents: U.S. Pat. No. 1,710,672, Bonney; U.S. Pat. No. 1,710,673, Bonney; U.S. Pat. No. 1,766,107, Cook, Jr.; U.S. Pat. No. 1,813,485, Cook, Jr.; U.S. Pat. No. 2,650,075, Carhart et al.; and French patent No. 574,500.

Another approach to vary the camber of the wing is shown in two patents issued to Antoni, U.S. Pat. No. 1,690,765 and U.S. Pat. No. 1,886,362. In these patents, forward and rear sections of the airfoil are connected to one another so that relative angular rotation of the two sections causes them to flex the wing in a curved configuration.

Another means of accomplishing the cambering of an airfoil is shown in U.S. Pat. No. 1,828,981, Parker, where the lower skin of the airfoil is connected to a plurality of pivotally mounted links, the angular positions of which are offset with respect to one another. Rotation of these links causes the middle portion of the lower skin to deflect upwardly, while the trailing edge portion of the airfoil is deflected downwardly.

U.S. Pat. No. 2,022,806, Grant, shows another mechanism for changing the camber along substantially the entire chord length of the airfoil by providing the airfoil with a supporting framework made up of a plurality of triangular trusses, the lower ends of which can be moved relative to each other. By moving the lower ends of the trusses either closer or further away from one another, the length of the lower skin of the wing can be changed with respect to the length of the upper skin, so as to cause a corresponding change in the camber of the wing.

Another approach is shown in U.S. Pat. No. 1,585,586, Hewitt, where the lower skin of an airfoil is connected at its forward end to a movable member. A simple actuator moves the movable member forwardly to pull the lower skin forwardly relative to the upper skin and thus cause the airfoil to assume a more curved configuration. U.S. Pat. No. 3,332,383, Wright, shows a variable camber airfoil where forward and rear mounting sections are pivotally connected one to another. Relative rotation of these two mounting sections causes the airfoil to assume a cambered configuration.

U.S. Pat. No. 1,823,069, Stroop, shows a device utilizing elongate actuating members which extend into the trailing edge, these actuating members tapering toward the trailing edge in a curved configuration. By rotating these curved members about their axial lengths, the outer curved tips thereof move upwardly or downwardly to change the camber of the airfoil. This same general concept appears in U.S. Pat. No. 3,109,613, Bryant et al., where there are a plurality of rotatable members extending into the trailing edge portion of the airfoil, with each rearwardly positioned member having an increased angular deviation from a straight line axis. By rotating these sets of members in unison, the airfoil is caused to assume a curved configuration.

U.S. Pat. No. 1,412,455, Crowell et al., shows an airfoil having a plurality of cam members mounted for rotation about horizontal axes which cause the lower skin section to move upwardly or downwardly. U.S. Pat. No. 2,484,687, Carl, Jr., shows a cable operated device to deflect the rear portion of a sail for a boat.

U.S. Pat. No. 3,698,668, Cole, shows a device for deflecting an edge portion of an airfoil by means of a mechanism made up of a plurality of canted hinges positioned in the variable camber section of the airfoil. These hinges are mounted about vertical axes, and rotation of the hinge members causes a shortening of the lower airfoil portion to cause it to curve.

U.S. Pat No. 3,941,344, Cole, shows several different mechanisms for deflecting both the leading and trailing edges of an airfoil. In general these devices comprise a rib beam or the like which extends into the cambered section, with this rib beam being deflected upwardly or downwardly to change the camber. The rib beam has associated linkage to deflect the extreme outer portion of the cambered section to an angle greater than the deflection of the rib beam itself.

While the prior art has provided devices which are operable to change the camber of an airfoil, there is still a continuing need to seek improvements with regard to simplicity and reliability of structure and operation, and also to accomplish the change of camber so that the airfoil, particularly with regard to its upper surface, is always in a smooth continuous curve with no significant surface discontinuities to induce flow separation.

SUMMARY OF THE INVENTION

The variable camber airfoil of the present invention comprises a support frame, upper and lower skins attached to the frame, and a trailing edge end section. There are upper and lower variable camber skin sections extending from this support frame rearwardly to the trailing edge end section.

A walking beam is positioned between the upper and lower variable camber skin sections. This walking beam comprises a forward positioning section and a rearwardly extending locating arm, and the walking beam is located relative to the frame by positioning means connecting the forward positioning section of the walking beam to the frame. This positioning means comprises a first forward connecting means interconnecting a forward connecting portion of the positioning section of the walking beam to the frame for movement of the forward connecting portion back and forth on an upwardly and forwardly slanting path. It further comprises a second rearward connecting means interconnecting a rearward connecting portion of the positiong section of the walking beam to the frame for movement back and forth on an upwardly and rearwardly slanting path. The effect of this is that the positioning section of the walking beam is constrained to move in a manner that forward movement thereof rotates the locating arm downwardly, and rearward movement thereof rotates the locating arm upwardly.

In the preferred form, the first and second connecting means comprise a pair of pivot links connected at their lower swing ends to the positioning portion of the walking beams at, respectively, forward and rear locations thereon. The two pivot links extend upwardly and converge toward one another to connect to the frame at spaced pivot locations.

There is a trailing edge beam which comprises a forward portion connected to a rear portion of the support frame, a rear portion connected to the trailing edge end section, and an intermediate portion pivotally connected to the rear end of the locating arm of the walking beam. The effect of this is that downward or upward rotational movement of the locating arm of the walking beam causes a corresponding downward or upward rotational movement of the trailing edge beam of a correspondingly greater degree of rotation, relative to the locating arm. In a preferred form, the forward portion of the trailing edge beam is mounted to the frame for moderate forward and slightly upward movement during downward rotation of the trailing edge beam, and rearward movement during upward rotation of the trailing edge beam. In the specific embodiment shown herein, this is accomplished by providing the forward portion of the trailing edge beam with a cam which moves in a cam slot in a rear portion of the support frame.

To cause proper contouring of the variable camber lower skin section, an actuating member is connected to the forward end of the lower variable camber skin section and mounted for fore and aft slide motion relative to the frame. In the preferred form, this variable camber lower skin section actuating member has a rearwardly extending connecting arm which is connected to the forward pivot link of the positioning means for the walking beam.

To drive the operating components of the present invention, there is a drive gear driven from a flexible shaft extending spanwise in the airfoil, which drive gear in turn engages a gear segment which is caused to move rearwardly and forwardly by rotation of the drive gear. This gear segment has a pivot link which connects to the forward pivot link of the positioning means for the walking beam. In the preferred form, this forward pivot link is a bell crank, the forward portion of which functions as the pivot link for the walking beam and the rear portion of which connects to the actuating link for the actuating member for the lower variable camber skin section.

Other features of the present invention will become apparent from the following detailed description.

BRIEF DESCRIPTION OF THE DRAWINGS

FIG. 1 is a sectional view of a rear variable camber section of an airfoil made according to the present invention, taken transverse to the spanwise axis of the airfoil, and showing the airfoil in its uncambered position;

FIG. 2 is a view similar to FIG. 1 showing the rear variable camber section of the airfoil in its full downwardly cambered position;

FIG. 3 is a view similar to FIGS. 1 and 2 showing the rear variable camber section of the airfoil in its upward cambered position; and FIG. 4 is a top view of a rear variable camber section, with the top skin section broken away to show a linkage unit thereof.

DESCRIPTION OF THE PREFERRED EMBODIMENT

Since in the preferred embodiment described herein the invention is incorporated in the trailing edge portion of an airfoil 10, for convenience of illustration, only the trailing edge portion of the airfoil is shown in the accompanying drawing. The airfoil 10 comprises a main support frame 12 to which are attached upper and lower skins 14 and 16, respectively. At the extreme rear end of the airfoil 10 there is a trailing edge end section 18 at which the upper and lower skins 14 and 16 join one to another to form the trailing edge of the airfoil 10.

There is a variable camber upper skin section 14a which extends from the upper rear portion of the frame 12 to the trailing edge end section 18, and also a variable camber lower skin section 16a which extends from the lower portion of the frame 12 to the trailing edge end section 18. At its forward end, the variable camber lower skin section 16a overlaps at 20 the main lower skin portion 16 to permit relative slide movement therebetween.

Before describing specifically the components and operation of the present invention, it is believed that a better appreciation of the present invention will be achieved by indicating briefly at this time the main functions accomplished by the apparatus of the present invention. The present invention is designed to be able to maintain the airfoil 10 in a substantially uncambered position as shown in FIG. 1, and to be able to move the airfoil either to a full down cambered position, as shown in FIG. 2, or to an upward cambered position, as shown in FIG. 3, in such a manner that the upper and lower skins 14 and 16 (particularly the variable camber upper section 14a) are at all times throughout the deployment in a smooth curve with no surface discontinuities which might induce flow separation. This requires that not only both the downward and rotational components of movement of the trailing edge end section 18 be properly coordinated, but also that the distance of the trailing edge end section from the frame 12 be properly controlled so that the variable camber upper skin section 14a can at all times assume a proper curvature which increases proportionately with increased deflection of the trailing edge end section 18.

To proceed to a detailed description of the present invention, the trailing edge portion of the airfoil 10 is provided with a plurality of linkage units 22 located at intervals along the spanwise length of the airfoil 10. For convenience of illustration, only one of the units 22 is shown herein. The main components of the linkage unit 22 are a support bracket 24 which is integral with the support frame 12, a walking beam 26 and a trailing edge beam 28.

The bracket 24 comprises a pair of rearwardly extending parallel bracket plates 30, spaced moderately from one another, and extending into the area between the forward portions of the upper and lower variable camber sections 14a and 14b. The upper and lower edge portions 32 and 34 of the bracket plates 30 are contoured in a manner to curve convergently toward each other in a rearward direction, to permit downward and upward curved deflection of the upper and lower variable camber skin sections 14a and 16a.

The walking beam 26 has identical right and left sections, rigidly connected to one another and positioned outside of the bracket plates 30. The walking beam 26 comprises a forward positioning section 36 and an integral rearwardly extending locating arm 38. The positioning section 36 has a first forward connecting point 40 and a second rearward connecting point 42. A first forward positioning link 44 is pivotally mounted at 46 between the two bracket plates 30, and has a lower swing end which connects to a transverse pin extending between the two sections of the walking beam 26 at its forward connecting point 40. There is a second rear connecting link 48 also positioned between the bracket plates 30 and pivotally mounted thereto at 50, this positioning link being connected at the outer swing end thereof to a second pin extending between the two side sections of the walking beam 26 at the rear connecting point 42.

With reference to FIG. 1, it can be seen that with the airfoil 10 in its uncambered position, the two pivot points 46 and 50 of the links 44 and 48 are positioned above, respectively, their outer swing end pivot connections 40 and 42, with the forward link 44 slanting upwardly and rearwardly and the rear link 48 slanting upwardly and forwardly. Thus, the two pivot points 46 and 50 are spaced from one another a distance which is smaller than the spacing between the two outer swing end pivot connections 40 and 42. This arrangement of the two positioning links 44 and 48 relative to the walking beam 26 is particularly critical in the present invention with regard to the proper location of the walking beam 26 in its movement to its various cambered positions. This will be explained more fully hereinafter, but to comment at this time briefly on this particular aspect of the present invention, reference is made to FIG. 1, where a first line 52 is drawn through points 40 and 46, and a second line 54 is drawn through points 42 and 50, with these lines intersecting at a point 56 located above and between the two pivot points 46 and 50. With the walking beam 26 in the position shown in FIG. 1, this point 56 acts as the instantaneous center of rotational movement of the walking beam 26.

In FIG. 2, which shows the airfoil 10 in its full down cambered position, two lines 52a and 54a have been drawn in a manner similar to lines 52 and 54 of FIG. 1. The intersecting point of these two lines 52a and 54a is designated 56a, and this is the instantaneous center of rotation for the walking beam 26 in position of FIG. 2. It can be seen that the instantaneous center of rotation has moved progressively rearwardly as the locating arm 38 of the walking beam 26 is deflected downwardly.

With reference to FIG. 3, lines 52b and 54b have been drawn in a manner similar to the lines 52 and 54 of FIG. 1, and it can be seen that the intersection of these lines 52b and 54b is at 56b, which is the instantaneous point of rotation for the walking beam 26 with the airfoil 10 in its up cambered position of FIG. 3. In this position, the center of instantaneous rotation has moved moderately below and forward of the forward pivot connection 46.

To continue with the description of the physical components of the present invention, the trailing edge beam 28 has a forward portion 58 connected to the rear end of the bracket plates 30, a rear end 60 connected to the trailing edge end section 18, and an intermediate portion 62 pivotally connected by means of a pin 64 between the rear ends of the two side by side members which make up the locating arm 28 of the walking beam 26. The forward end 58 of the trailing edge beam 28 has a cam member 66 located in a pair of cam slots 68 at the rear ends of the two bracket plates 30.

To indicate at this time briefly the operating movement of the trailing edge beam 28, with reference to FIG. 1, it can be seen that in the uncambered position of the airfoil 10, the trailing edge beam 28 is in substantial alignment with the chordwise axis of the airfoil 10. When the airfoil 10 is moved to its downward cambered position, as shown in FIG. 2, the downward rotational movement of the locating arm 38 of the walking beam 26 causes a corresponding downward rotational movement of the trailing edge beam 28 of a correspondingly greater degree of rotation relative to the locating arm 38. Likewise, when the airfoil 10 is moved to its up cambered position as shown in FIG. 3, the upward rotational movement of the locating arm 38 causes an upward rotational movement of the trailing edge beam 28 of a correspondingly greater degree of rotation relative to the locating arm 38.

The forward overlapping end portion 20 of the lower variable camber section 16a is connected to a lower variable camber actuating member 72 which is slide-mounted by means of a plurality of rollers 74 in a slideway 76 fixedly mounted to a lower rear portion of the support frame 12. The aforementioned forward positioning link 44 is actually shaped as a bell crank and thus provides a second pivot connection 78 rearwardly of the swing pivot connection 40 just above the lower variable camber skin section 16a. The actuator 72 is connected by an actuating link 80 to the pivot connection 78, so that rotational movement of the bell crank connecting link 44 in either direction causes fore and aft movement of the actuator 72. The link 80 is provided with a threaded adjustment sleeve 82 so that the precise position of the actuating member 72 can be adjusted relative to the bell crank connecting link 44.

To drive the several linkage units 22, there is a main drive shaft 84 extending along the spanwise axis of the airfoil 10, and having for each linkage unit 22 a drive gear 86. Each drive gear 86 meshes with a related gear segment 88 pivotally mounted at 90 to the two bracket plates 30 at a location forward of the walking beam 26. Spaced radially outwardly from the pivot location 90, the gear segment 88 has a pivot connection 92 connected to the forward end of a main actuating link 94, the rear end of which is pivotally connected to the bell crank positioning link 44 at the aforementioned connecting location 40. Thus, a clockwise rotation of the main drive shaft 84 (as viewed in FIG. 1) causes a counter-clockwise rotation of the gear segment 88 to rotate the walking beam 26 forwardly, and opposite rotational movement of the drive shaft 84 rotates the walking beam 26 rearwardly.

The two bracket plates 30 are provided with forward and rear arcuate slots 96 and 98, respectively, to accommodate the pivot pin connections at 40 and 42 of the links 44 and 48 to the walking beam 26. A stop member is provided at 100, and has an abutment face 102 to limit the rearward rotational movement of the bell crank positioning link 44.

A leaf spring 104 is attached between the locating arm 38 and the trailing edge beam 28 in a manner to urge the cam member 66 downwardly in the cam slot 68. This action effectively precludes chatter of the trailing edge section 18 due to tolerance variation between the cam member 66 and its related slot 68.

To describe in more detail the physical arrangement of the various operating components, reference is now made to FIG. 4. It can be seen that the trailing edge beam 28 is made in two sections positioned outside of and on opposite sides of the two bracket plates 30, and that the two sections of the walking beam 26 are positioned outside the trailing edge beam 28. The actuating links 44, 48, 80 and 94, and also the gear segment 88 are positioned between the bracket plates 30.

To describe the overall operation of the present invention, as shown in FIG. 1, with the airfoil 10 in its substantially uncambered position, the walking beam 26 and the trailing edge beam 28 are in substantial alignment with the chordwise axis of the airfoil 10 so that the upper and lower skin sections 14 and 16 are in a substantially uncambered position. To move the trailing edge portion of the airfoil 10 to its downward cambered position, the main shaft 84 is rotated clockwise to cause counter-clockwise rotation of the gear segment 88 which pulls the main actuating link 94 forwardly to move the walking beam 26 forwardly and to cause it to rotate in a manner to move the locating arm 38 downwardly. Since the trailing edge beam 28 is connected at its forward end by the cam member 66 to the bracket plates 30, and is also connected at its intermediate pivot point 64 to the rear end of the locating arm 38, the trailing edge beam 28 is caused to swing downwardly and rotate to a degree greater than the downward rotation of the rotation of the locating arm 38. This causes the proper downward and rotational movement of the trailing edge end section 18.

As indicated earlier, one of the main objectives of the present invention is to move the trailing edge portion of the airfoil to its cambered position so that both the upper and lower variable camber skin sections 14a and 16a at all times remain in a smooth continuous curve to alleviate any tendency for flow separation over these surface portions. To analyze how this is accomplished in the movement of the trailing edge section of the airfoil 10 to its down cambered position, the forward end of the upper variable camber skin section can be seen to be located at a location approximately above the forward pivot connection 46 of the forward link 44, this location being indicated at 106. In the down cambered position of FIG. 2, the variable camber upper skin section extends in a continuous curve from the location of the point 106 downwardly and rearwardly to the trailing edge end section 18.

As indicated earlier herein, with the airfoil 10 in the uncambered position of FIG. 1, the instantaneous center of rotation of the walking beam 26 is at point 56 which can be seen to be quite close to the forward point 106 of the upper variable cambered surface section 14a. Thus, during initial downward movement of the locating arm 38 of the walking beam 26, while the end pivot connection point 64 on the locating arm 38 rotates relative to the point 106, the end pivot connection point 64 has hardly any movement toward this point 106.

However, as the walking beam 26 continues to rotate so that its locating arm 38 continues its downward movement, as indicated earlier herein with reference to FIG. 2, the instantaneous center of rotation moves from point 56 of FIG. 1 to the location indicated at 56a in FIG. 2. Thus, with continued rotation of the locating arm 38, the outer pivot end 64 of the locating arm 38, in addition to rotating relative to the forward point 106 of the variable camber upper skin section 14a, moves nearer to the point 106. This causes the trailing edge end section 18 to move closer to the point 106, thus shortening the chord distance from the point 106 to the end tip of the trailing edge section 18, this chord distance being indicated as extending along line 108 in FIG. 2.

The cam connection at 60 permits the forward end 58 of the trailing edge beam 28 to move upwardly and forwardly in the frame brackets 30 to permit this shortening of the chord length at 108. Also, as indicated earlier, the combined action of the walking beam 26 and the trailing edge beam 28 causes the trailing edge end section 18 to rotate to the proper degree. Thus, the upper variable camber skin section 14a is at all times in a proper curved contour during its movement from the position of FIG. 1 to the position of FIG. 2.

With regard to the lower variable camber skin section 16a, the initial rotational movement of the walking beam 26 from the location of FIG. 1 to that of FIG. 2 causes immediate forward movement of the lower variable camber skin section 16a. With the forward overlapping end 20 of this skin section 16a being connected by its actuator 72 and link 80 to the bell crank 44, the forward skin section 20 is moved forwardly at a desired rate to match the downward and forward rotational movement of the trailing edge end section 18, so that the lower variable camber skin section 16a remains at all times in a properly contoured curve during deployment of the trailing edge end section from the location of FIG. 1 to the location in FIG. 2.

When the trailing edge section of the airfoil 10 is moved to its up cambered position, as shown in FIG. 3, the instantaneous center of rotation 56 at the uncambered position in FIG. 1 begins movement downwardly toward the point 56b, which, as shown in FIG. 3, is moderately below the forward point 106 of the upper variable camber skin section 16a. The effect of this is that initial upward rotational movement of the trailing edge end section 18 results in substantially no movement of the trailing edge end section 18 closer to the forward point 106. However, as the trailing edge end section 18 approaches its upper end limit of travel, as the effective center of rotation of the walking beam 26 moves from point 56 to 56b, there is some movement of the trailing edge end section 18 closer to the point 104, to permit the upper variable camber skin section to assume the moderate curve indicated in FIG. 3. Also the rotation of the trailing edge beam 28 rotates the trailing edge end section 18 to the proper degree.

With regard to the lower variable camber skin section 16a, upward movement of the trailing edge end section 18 results in immediate rearward movement of the skin section 16a. The rearward movement of the bell crank 44 acting through the actuating link 80 moves the forward overlapping end portion of the variable camber skin section rearwardly a sufficient distance so that the lower variable camber skin section 16a assumes a proper curved contour as shown in FIG. 3.

What is claimed is:
1. A variable camber airfoil comprising:
 a. a support frame,
 b. upper and lower skins attached to said frame,
 c. a trailing edge end section,
 d. a variable camber upper skin section extending from said frame to said trailing edge end section,
 e. a variable camber lower skin section connecting to the trailing edge end section and extending forwardly therefrom toward said frame,
 f. a walking beam positioned between the upper and lower variable camber skin sections, said walking beam comprising a forward positioning section and a rearwardly extending locating arm, g. positioning means to locate said forward positioning section of the walking beam relative to said frame, said positioning means comprising:
1. a first forward connecting means interconnecting a forward connecting portion of the positioning section of the walking beam to said frame for movement of the forward connecting portion back and forth on an upwardly and forwardly slanting path,
2. a second rearward connecting means interconnecting a rearward connecting portion of the positioning section of the walking beam to the frame for movement back and forth on an upwardly and rearwardly slanting path, whereby said positioning section is constrained to move in a manner that forward movement thereof rotates said locating arm downwardly, and rearward movement thereof rotates said locating arm upwardly, h. a trailing edge beam, comprising:
1. a forward portion connected to said frame,
2. a rear portion connected to said trailing edge end section,
3. an intermediate portion connected to said locating arm, whereby downward or upward rotational movement of the locating arm of the walking beam causes a corresponding downward or upward rotational movement of the trailing edge beam of a correspondingly greater degree of rotation relative to said locating arm.

2. The airfoil as recited in claim 1, wherein the forward portion of the trailing edge beam is mounted to said frame for forward movement relative thereto during downward rotational movement of the trailing edge beam, and rearward movement relative thereto during upward rotational movement of the trailing edge beam.

3. The airfoil as recited in claim 2, wherein the forward portion of the trailing edge beam is mounted to the frame by means of a cam follower mounted to a cam member which constrains movement of the cam follower along its course.

4. The airfoil as recited in claim 1, wherein at least one of said forward and rearward connecting means comprises a pivot link having a pivot connection to said frame and a swing end connection to said walking beam.

5. The airfoil as recited in claim 1, wherein the forward connecting means of the positioning means for the walking beam constrains the forward connecting portion of the walking beam for general rotational movement about a first pivot axis, and the second rearward connecting means of the positioning means for the walking beam constrains the rearward connecting portion of the positioning section for general rotational movement about a second pivot axis positioned rearwardly of the first pivot axis for the forward connecting means, whereby rotational movement of the positioning section of the walking beam is about a point of rotation spaced from the first and second pivot axes.

6. The airfoil as recited in claim 5, wherein said forward connecting means for the positioning section comprises a first pivot link pivotally connected to said frame, and said second rearward connecting means for the positioning section of the walking beam comprises a second pivot link pivotally mounted to the frame at a location rearwardly of the first pivot link, said first and second pivot links being so positioned that with the airfoil in its uncambered position, said pivot links extend upwardly and convergently toward one another.

7. The airfoil as recited in claim 6, wherein the forward portion of the trailing edge beam is mounted to said frame for forward movement relative thereto during downward rotational movement of the trailing edge beam, and rearward movement relative thereto during upward rotational movement of the trailing edge beam.

8. The airfoil as recited in claim 7, comprising a lower variable camber actuating member connected to a forward portion of the lower variable camber skin section, the actuating member for the lower variable camber skin section being operatively connected to the positioning means for the walking beam whereby forward or rearward movement of the walking beam causes a corresponding forward or rearward movement of the actuating member for the lower variable camber skin section.

9. The airfoil as recited in claim 8, wherein the actuating member for the lower variable camber skin section is mounted in slide means mounted to said frame.

10. The airfoil as recited in claim 8, wherein said actuating member for the lower variable camber skin section is connected by linkage means to the first pivot link of the positioning means for the walking beam.

11. The airfoil as recited in claim 5, wherein the forward portion of the trailing edge beam is mounted to said frame for forward movement relative thereto during downward rotational movement of the trailing edge beam, and rearward movement relative thereto during upward rotational movement of the trailing edge beam.

12. The airfoil as recited in claim 5, comprising a lower variable camber actuating member connected to a forward portion of the lower variable camber skin section, the actuating member for the lower variable camber skin section being operatively connected to the positioning means for the walking beam whereby forward or rearward movement of the walking beam causes a corresponding forward or rearward movement of the actuating member for the lower variable camber skin section.

13. The airfoil as recited in claim 1, comprising a lower variable camber actuating member connected to a forward portion of the lower variable camber skin section, the actuating member for the lower variable camber skin section being operatively connected to the positioning means for the walking beam whereby forward or rearward movement of the walking beam causes a corresponding forward or rearward movement of the actuating member for the lower variable camber skin section.

14. The airfoil as recited in claim 1, wherein
a. the forward connecting means of the positioning means for the walking beam constrains the forward connecting portion of the walking beam for general rotational movement about a first pivot axis, and the second rearward connecting means of the positioning means for the walking beam constrains the rearward connecting portion of the positioning section for general rotational movement about a second pivot axis positioned rearwardly of the first pivot axis for the forward connecting means, whereby rotational movement of the positioning section of the walking beam is about a point of rotation spaced from the first and second pivot axes, b. the forward portion of the trailing edge beam is mounted to said frame for forward movement relative thereto during downward rotational movement of the trailing edge beam, and rearward movement relative thereto during upward rotational movement of the trailing edge beam, c. said airfoil further comprising a lower variable camber actuating member connected to a forward portion of the lower variable camber skin section, the actuating member for the lower variable camber skin section being operatively connected to the positioning means for the walking beam whereby forward or rearward movement of the walking beam causes a corresponding forward or rearward movement of the actuating member for the lower variable camber skin section.

15. The airfoil as recited in claim 14, comprising drive means operatively connected to said first pivot link of the positioning means for the walking beam, said drive means comprising a gear segment mounted for rotation to said frame, said gear segment having a connecting link having a first end connected thereto and a second end connected to the first pivot link of the positioning means.

* * * * *